United States Patent [19]

Lin

[11] Patent Number: 5,245,642
[45] Date of Patent: Sep. 14, 1993

[54] METHOD OF CONTROLLING CO-60 RADIATION CONTAMINATION OF STRUCTURE SURFACES OF COOLING WATER CIRCUITS OF NUCLEAR REACTORS

[75] Inventor: Chien C. Lin, Fremont, Calif.

[73] Assignee: General Electric Company, San Jose, Calif.

[21] Appl. No.: 785,649

[22] Filed: Oct. 31, 1991

[51] Int. Cl.⁵ .............................................. G21C 19/00
[52] U.S. Cl. ..................................... 376/310; 376/306
[58] Field of Search .............. 376/308, 310, 305, 277, 376/306

[56] References Cited

U.S. PATENT DOCUMENTS

| | | | |
|---|---|---|---|
| 4,476,047 | 10/1984 | Bonnici et al. | 376/306 |
| 4,764,338 | 8/1988 | Uchida et al. | 376/313 |
| 4,894,202 | 1/1990 | Nagase et al. | 376/306 |
| 5,015,436 | 5/1991 | Nagase et al. | 376/306 |
| 5,024,805 | 6/1991 | Murray | 376/305 |

Primary Examiner—Donald P. Walsh
Assistant Examiner—Frederick H. Voss
Attorney, Agent, or Firm—J. S. Beulick

[57] ABSTRACT

A method for chemically controlling cobalt decontaminating the water cooling system of a water cooled nuclear fission reactor to reduce the radiation hazard to personnel.

8 Claims, No Drawings

METHOD OF CONTROLLING CO-60 RADIATION CONTAMINATION OF STRUCTURE SURFACES OF COOLING WATER CIRCUITS OF NUCLEAR REACTORS

BACKGROUND OF THE INVENTION

This invention relates to the operation and safety of water cooled nuclear fission reactors, and in particular to measures for reducing the hazards of possible exposure of operating and maintenance personnel to a source of radiation dispersed throughout the coolant water circulating system of such nuclear reactors.

A significant potential hazard in water cooled nuclear fission reactors, such as boiling water reactors, is the spread of radioactive substances throughout the circulating system for the reactor coolant water. Operating personnel and maintenance workers can be subjected to radiation from such extensively dispersed radioactive substances within and about many areas or locations of the nuclear reactor plant. Increased radiation and its dispersion within a reactor plant presents both an elevated health hazard and economic liability due to restricted work time exposure for workers in such area of radiation presence.

Cobalt, derived from a number of different alloys commonly employed in components of the reactor's mechanisms or structures, is subject to induced radioactivity, especially the cobalt-60 isotope. This radioactive cobalt-60 isotope, or ions or compounds thereof, can be carried in the circulating coolant water flowing through the coolant water circuit whereby the radioactive substances are spread and deposited throughout the cooling water circuit or primary loop system of the reactor plant. Such radioactive substances are prone to become taken up and incorporated into the normally occurring oxide films which form and progressively accumulate on the inner coolant water retaining structural surfaces that provide the reactor coolant water circuit.

A number of proposals or potential solutions to this problem of dispersion of radioactive substances throughout the coolant water circuit or system and incorporation into the inherently produced oxide films forming over the surfaces of structures providing the coolant water circuit or system have been considered or made. One approach to controlling the potentially hazardous cobalt source of such radiation has been the application of zinc as disclosed in several U.S. patents, for example U.S. Pat. Nos. 4,756,874, issued Jul. 12, 1988 and 4,759,900, issued Jul. 26, 1988. The disclosure and contents of the aforesaid patents are incorporated herein by reference.

SUMMARY OF THE INVENTION

This invention comprises a method for controlling Co-60 isotope radiation contamination occurring on the surfaces of structures providing a coolant water circuit or system of a water cooled nuclear fission reactor plant. The method of this invention comprises the application of chemical measures or agents and physical conditions which impede buildup of the Co-60 isotope on the surface of metal components or structures that provide the primary coolant water system for the typical circulation of coolant water in a water cooled nuclear fission reactor.

DETAILED DESCRIPTION OF THE INVENTION

This invention consists of a chemical process for removing cobalt contaminated oxide films that form on the surfaces of metal structures providing the coolant water circuits of water cooled nuclear fission reactors, such as inner portions of pipes, conduits, vessels, tanks, chambers, etc.

Cobalt derived from metal alloy materials utilized in nuclear reactor plants is known as a major source of radiation, and in turn is a health hazard to operating and maintenance personnel working about the nuclear reactor structures. Cobalt, particularly the cobalt-60 isotope, is carried in the coolant water throughout the nuclear reactor coolant circuit or system and becomes entrained and/or embedded in the mass of oxides commonly forming and accreting over the exposed metal surfaces of vessels, conduits, etc. of the coolant water circuit system. Reducing the presence of cobalt by replacing cobalt containing alloys with alloys free of cobalt to minimize its source is expensive and most often impractical.

Chemical decontamination procedures for removing cobalt contaminated oxide films from inside surfaces of coolant water containing structures have been proposed whereby the hazardous radiation fields are substantially reduced through oxide film removal by chemical means. However, due to extremely high corrosion rates, the decontaminated surfaces rapidly pick up cobalt-60 from the circulating coolant water and retain it in the accreting body of oxides forming over exposed surfaces. Thus, radiation levels measured one cycle after decontamination are frequently as great as before decontamination.

In accordance with this invention a chemical technique is provided which controls and/or minimizes contamination in water cooled nuclear fission reactor system following decontamination. By minimizing recontamination, the chemical method of this invention can be a more effective means of reducing radiation exposure of personnel in a nuclear reactor plant.

The chemical measures of this invention entail a combination of conditions that reduce the soluble (ionic) Co-60 concentration in reactor coolant water and pre-oxidize the surface of the coolant water retaining system with a oxide film substantially free of Co-60. The means of the invention comprise adding a solution of an iron compound, including, but not limited to, freshly prepared insoluble species $Fe(OH)_3$, $Fe_2O_3$, $Fe_3O_4$, or water soluble compounds ferrous oxalate and ferric citrate in amounts sufficient to maintain a soluble iron concentration in the coolant water of the coolant system at about 200 parts per billion (ppb). With these conditions, preferably augmented by elevated water temperatures, the soluble (ionic) Co-60 in the reactor coolant water is effectively scavenged. Moreover, while the soluble Co-60 concentration in the coolant water is reduced, the surfaces of the coolant water retaining system can be oxidized to form a substantially cobalt free, protective film following a cobalt purging.

Preferred conditions for the practice of this invention comprise adequate $Fe(OH)_3$ addition to maintain the iron concentration of approximately 200 ppb with the coolant water at a temperature of at least about 230° C. Generally optimum effects are obtained when these conditions of iron concentration and temperature are retained in the coolant water of the reactor coolant system over a period of at least about 500 hours.

The elevated temperatures of the coolant water can be provided without nuclear fission produced heat in a pre-startup treatment by any suitable means or source, such as heat generated by recirculation pumps which drive the coolant water through the reactor coolant system.

In a typical reactor pre-startup treatment procedure of this invention, apt amounts of ferric hydroxide in a slightly basic water solution are injected into the reactor coolant for attaining the iron concentration conditions of about 200 ppb. Coolant water temperature is maintained at least about 230° C. Given these conditions, the soluble Co-60 in the coolant water can be reduced down to less than about one percent of the total Co-60 concentration in the reactor water.

To foster oxidation of the surfaces of cooling water circuit system upon purging of Co-60 from the coolant water, the dissolved oxygen content in the reactor coolant water is maintained at about 200 to about 400 parts per billion (ppb). This can be provided by introducing oxigated water, such as control rod drive water or other sources, or injecting oxygen. Preferably the operation of pH adjustment with iron solution addition for Co-60 purging of the coolant water system, and oxygen level control is carried out as long as is practical before startup of the nuclear reactor, for example at least about 500 hours.

Following starting up of the water cooled nuclear fission reactor, the iron content of the coolant water may be depleted rapidly, whereby a high iron solution injection rate can be appropriate or required to maintain the iron content at least about 50 to about 100 parts per billion. Then the nuclear reactor is operated under the given conditions for approximately 500 hours before the iron solution injection is terminated. At this state the iron content of the coolant water should be maintained at about 5 ppb. This be can achieved by means of feedwater quality control.

I claim:

1. A method for controlling Co-60 radiation recontamination on the surfaces of structures providing a coolant water circuit of a boiling water nuclear fission reactor following decontamination, consisting essentially of:

adding a solution of at least one iron compound selected from the group consisting of ferrous oxalate, ferric citrate, and freshly prepared $Fe(OH)_3$, $Fe_2O_3$ and $Fe_3O_4$ to coolant water of a water cooled nuclear fission reactor in amounts sufficient to maintain an iron concentration in the coolant water circulating through the coolant water circuit of the water cooled nuclear fission reactor at about 200 parts per billion.

2. The method for controlling Co-60 radiation recontamination on the surface of structures providing a coolant water circuit of a boiling water nuclear fission reactor of claim 1, comprising maintaining the coolant water circulating through the coolant water circuit at a temperature of at least about 230° C.

3. A method for controlling Co-60 radiation contamination on the surfaces of structures providing a coolant water circuit of a boiling water nuclear fission reactor, consisting essentially of the steps of:

adding a solution of at least one iron compound selected from the group consisting of ferrous oxalate, ferric citrate, and freshly prepared $Fe(OH)_3$, $Fe_2O_3$ and $Fe_3O_4$ to coolant water of a water cooled nuclear fission reactor in amounts sufficient to maintain an iron concentration in the coolant water circulating through the coolant water circuit at about 200 parts per billion, and maintaining a dissolved oxygen content in the coolant water circulating through the coolant wataer circuit of the water cooled nuclear fission reactor at about 200 to about 400 parts per billion.

4. The method for controlling Co-60 radiation recontamination on the surface of structures providing a coolant water circuit of a boiling water nuclear fission reactor of claim 3, comprising maintaining the coolant water circulating through the coolant water circuit at a temperature of at least about 230° C.

5. The method for controlling Co-b 60 radiation recontamination on the surface of structures providing a coolant water circuit of a boiling water nuclear fission reactor of claim 3, comprising maintaining the induced pH and iron concentration condition of the circulating coolant water for a period of at least about 500 hours.

6. The method for controlling Co-60 radiation recontamination on the surface of structures providing a coolant water circuit of a boiling water nuclear fission reactor of claim 3, comprising applying the pH adjustment and iron concentration while the nuclear reactor is shut down, and continuing the treatment during subsequent fission operation of the water cooled nuclear reactor while maintaining an iron concentration in the circulating coolant water at about 50 to about 100 parts per billion.

7. A method for controlling Co-60 radiation contamination on the surfaces of structures providing a coolant water circuit of a boiling water nuclear fission reactor, consisting essentially of the steps of:

adding a solution of at least one iron compound selected from the group consisting of ferrous oxalate, ferric citrate, and freshly prepared $Fe(OH)_3$, $Fe_2O_3$ and $Fe_3O_4$ to coolant water of a water cooled nuclear fission reactor in amounts sufficient to maintain an iron concentration in the coolant water circulating through the coolant water circuit at about 200 parts per billion, maintaining the coolant water circulating through the coolant water circuit at a temperature of at least about 230° C., and continuing said pH adjustment, iron solution addition and temperature maintenance for a period of at least about 500 hours.

8. The method for controlling Co-60 radiation contamination on the surface of structures providing a coolant water circuit of a boiling water nuclear fission reactor of claim 7, comprising applying the pH adjustment, iron solution addition and temperature maintenance while the nuclear reactor fuel core is shut down, and continuing the said treatment steps during subsequent fission operation of the fuel core of the water cooled nuclear reactor while maintaining a lower iron concentration in the circulating coolant water of about 50 to about 100 parts per billion.

* * * * *